(12) United States Patent
Terada et al.

(10) Patent No.: US 8,593,087 B2
(45) Date of Patent: Nov. 26, 2013

(54) MAGNETIC POLE POSITION ESTIMATION METHOD FOR AC SYNCHRONOUS MOTOR

(75) Inventors: Kei Terada, Chiyoda-ku (JP); Satoshi Aoki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 789 days.

(21) Appl. No.: 12/678,888

(22) PCT Filed: Nov. 14, 2008

(86) PCT No.: PCT/JP2008/003318
§ 371 (c)(1),
(2), (4) Date: Jun. 9, 2010

(87) PCT Pub. No.: WO2009/095963
PCT Pub. Date: Aug. 6, 2009

(65) Prior Publication Data
US 2010/0286948 A1 Nov. 11, 2010

(30) Foreign Application Priority Data

Jan. 29, 2008 (JP) .................................. 2008-017787

(51) Int. Cl.
*H02P 21/00* (2006.01)
(52) U.S. Cl.
CPC .................................. *H02P 21/0035* (2013.01)
USPC .................. 318/400.02; 318/400.01; 318/700
(58) Field of Classification Search
CPC .................................................. H02P 21/0035
USPC ................................ 318/400.02, 400.01, 700
See application file for complete search history.

(56) References Cited

U.S. PATENT DOCUMENTS

| 6,155,231 | A |   | 12/2000 | Adachi et al. |
| 7,161,324 | B1 | * | 1/2007 | Satake et al. .................. 318/720 |

FOREIGN PATENT DOCUMENTS

| JP | 09-074783 A | 3/1997 |
| JP | 2001-095283 A | 4/2001 |
| JP | 2001-204190 A | 7/2001 |
| JP | 2002-247881 A | 8/2002 |
| JP | 2003-209991 A | 7/2003 |
| JP | 2004-180451 A | 6/2004 |

(Continued)

OTHER PUBLICATIONS

Japanese Office Action, dated Aug. 21, 2012, in corresponding Japanese Application No. 2008-017787.
H. Sugimoto, et al., "Magnetic Pole Position Detection Method and Control of Brushless DC Servomotor with Incremental Encoder," T. IEE Japan, 2002, vol. 122-D, No. 9, pp. 899-909.

(Continued)

*Primary Examiner* — Bentsu Ro
*Assistant Examiner* — David Luo
(74) *Attorney, Agent, or Firm* — Sughrue Mion, PLLC

(57) ABSTRACT

If there is static friction, the magnetic pole position estimation is completed at the time when error torque used for magnetic pole position estimation becomes less than the friction, so that there remains magnetic pole error. A problem has been that when the error torque becomes less than a forward static friction, there remains a positive magnetic pole deviation and when the error torque becomes less than a backward static friction, there remains a negative magnetic pole deviation. By shifting in the negative direction and the positive direction initial values for estimating a magnetic pole error in operation sets, a true pole-error estimation value is estimated in the use of a pole-error estimation value having a positive magnetic pole error obtained by the positive shift operation and a negative one obtained by the negative shift operation, which can reduce estimation error due to the static friction.

7 Claims, 4 Drawing Sheets

(56) References Cited

FOREIGN PATENT DOCUMENTS

| | | | |
|---|---|---|---|
| JP | 2005-229717 | A | 8/2005 |
| JP | 2006-136200 | A | 5/2006 |
| JP | 2007-006585 | A | 1/2007 |
| JP | 2007-259610 | A | 10/2007 |

OTHER PUBLICATIONS

Chinese Office Action, dated Jan. 14, 2013, in corresponding Chinese Application No. 200880115417.5.
Taiwan Office Action, Apr. 9, 2012.
Korean Office Action dated Jul. 1, 2011.

* cited by examiner

MAGNETIC POLE POSITION ESTIMATION METHOD FOR AC SYNCHRONOUS MOTOR

TECHNICAL FIELD

The present invention relates to sensing a magnetic pole position of AC synchronous motors including linear motors.

BACKGROUND ART

In controlling an AC synchronous motor with a servocontrol, the so-called vector control is generally used, in which electric current is resolved into a d-axis component—a current in the direction of a motor flux, and a q-axis component—a current in a torque direction orthogonal to the d-axis, whereby each of the current components is controlled. In order to perform the vector control, it is necessary to precisely sense a position of the magnetic pole.

Linear motors are often used combined with incremental encoders; however, an incremental encoder only senses relative positions, so that it is necessary to sense an initial position of the magnetic pole. When an initial magnetic pole position is sensed inaccurately, an axis error phenomenon occurs in which a true magnetic pole position of a motor does not coincide with a magnetic pole position sensed by a control system.

On the other hand, rotating motors are generally used combined with absolute encoders, so that their magnetic pole position is sensed and stored in advance. When an absolute encoder is used, it is not required to sense the initial magnetic pole position; however, installation errors or the like will cause the axis error phenomenon. The axis error phenomenon results in deterioration of accuracy in controlling torques, reduction of the maximum torque to be generated and the like.

Background art documents are listed below.

Non-Patent Document 1: the institute of electrical engineers of Japan, transactions on industry applications, vol. 122, No. 9, 2002

Patent Document 1: Japanese Patent Laid-Open No. 2002-247881

Non-Patent Document 1 discloses a technique, "Magnetic Pole Position Detection Method and Control of Brushless DC Servomotor with Incremental Encoder" in the institute of electrical engineers of Japan, transactions on industry applications, vol. 122, No. 9, 2002. The technique uses such a principle that when a d-axis position of a true magnetic pole position of a controlled motor (hereinafter, referred to as a true magnetic pole position of a motor), coincides with that of a magnetic pole position targeted by a controlling system (hereinafter, referred to as a target magnetic pole position), a d-axis electric current being applied does not generate torque and that when the true magnetic pole position does not coincide with the target magnetic pole position, the d-axis electric current being applied generates torque in accordance with the quantity of the axis error. More specifically, a signal for magnetic pole position detection is applied as a current command; then, a torque generated by the difference between the target magnetic pole position and the true magnetic pole position of the motor moves a motor mover, the speed of which is sensed; and then, the sensed speed is proportionally and integrally compensated to be used for correcting a phase for coordinate transformation; whereby, the quantity of the axis error can be finally converged to zero, so that the magnetic pole position can be estimated.

However, when there exist disturbances, or especially when there exists large static friction, a torque for estimating magnetic pole position is hidden in the friction torque; therefore, a problem is that a large error remains in its estimation. To solve this problem, the technique proposes that the amplitude of the signal for the magnetic pole position detection is made larger so that the estimation error is reduced; however, the proposed technique leads to other problems such as larger movements of the motor mover and louder noises during the estimation. Furthermore, amplifier capacity limits the amplitude of the current; there is accordingly a limit in the technique that the amplitude of the signal for the magnetic pole position detection is made larger in order to reduce its estimation error, which may not solve the problem.

On the other hand, there is another technique disclosed in Japanese Patent Laid-Open No. 2002-247881, as follows. In this technique, a current for detecting a magnetic pole position is applied to the motor; the position information of the magnetic pole attracted toward the magnetic flux generated by the current is obtained to estimate the magnetic pole position on the basis of the information. In this case, the phase of the applied current is shifted from a reference phase, to the reference phase +180 degrees, to the reference phase −90 degrees, and to the reference phase +90 degrees, and every magnetic pole movement caused thereby is sensed to estimate the magnetic pole position. Calculations of the magnetic pole position are performed using sensed values each obtained after the phase of the current for detection is shifted to the reference phase −90 degrees and to the reference phase +90 degrees, which can reduce accuracy degradation caused by static friction in sensing the magnetic pole position.

However, there remain problems below. Firstly, the technique uses a procedure in which a current with a phase is applied only during an appropriately short time and immediately after that the phase is shifted within a short time to move the magnetic pole move less, and does not use a method in which the quantity of motor mover movement is controlled by a feedback control loop with respect to its position or speed; therefore, a problem is that the actual quantity of motor mover movement cannot be sufficiently reduced in such a condition that friction is extremely small in comparison with the amplitude of an estimation-use signal. Furthermore, because this technique does not include convergence operations such as a feedback control, it cannot use such a procedure as switching to the next operation set after convergence of movement; thus, it becomes necessary to set a time appropriate for switching, but a problem is that it is difficult to adjust that time.

Secondly, the document of the technique explains that by sequentially issuing a pair of commands for diagonal phases of the magnetic field, a rotation amount becomes very small and a rotational position returns back; however, because the operations sensing a magnetic pole position do not include a feedback control loop with respect to the magnetic pole position or speed, the rotation position does not return back to the original position by a single set of operations for detection; then, a problem is that the magnetic pole position after the detection is not guaranteed to be the same as that before the detection. When there exist different disturbances, for example, in a positive direction and a negative one, there arises a problem that motor mover positions become different before and after its detection. Especially when the detection operation set is repeated a number of times, there arises a problem that the magnetic pole position is shifted gradually. The document of the technique describes that a position/speed control unit is incorporated in the configuration so as to solve the problem; however, in an ordinary position/speed control loop, when the magnetic pole position is displaced, the control loop does not normally operate, so that the configuration described above cannot solve the problem.

Thirdly, because the technique uses an arctangent function to estimate the magnetic pole position, a problem is that its calculation load is heavy so that a lot of calculation time is required.

DISCLOSURE OF INVENTION

A magnetic pole position estimation method according to the present invention controls a relative position or relative speed of a motor mover by inputting into a position/speed control unit a value sensed by a motor sensor, performs coordinate transformation, in the use of a pole-error estimation value that the position/speed control unit outputs, of phases of currents or voltages applied to the motor, and estimates a motor magnetic pole position being a relative position of the motor mover by making the pole-error estimation value approximate a true pole-error value that is the difference between a motor magnet pole position being a relative position of the motor mover and a target magnet pole position being a target relative position of the motor mover. To solve the problems, the estimation method includes a first pole-error inputting step of inputting a first pole-error estimation value whose phase is shifted by $+\alpha$ from a reference phase; a forward movement step of making the pole-error estimation value approximate the true pole-error value, in the use of a value sensed by the motor sensor when the relative position of the motor mover is moved forward by the first pole-error inputting step; a first phase movement storing step of storing a first pole-error-estimate convergence value that is a phase when relative movement of the motor mover has converged in the forward movement step; a second pole-error inputting step of inputting a second pole-error estimation value whose phase is shifted by $-\alpha$ from the reference phase; a backward movement step of making the pole-error estimation value approximate the true pole-error value, in the use of a value sensed by the motor sensor when the relative position of the motor mover is moved backward by the second pole-error inputting step; a second phase movement storing step of storing a second pole-error-estimate convergence value that is a phase when relative movement of the motor mover has converged in the backward movement step; and a pole position estimating step of estimating the true magnetic pole position on the basis of pole-error-estimate convergence values stored in the first phase movement storing step and the second phase movement storing step.

A magnetic pole position estimation method according to the present invention controls a relative position or relative speed of a motor mover by inputting into a position/speed control unit a value sensed by a motor sensor, performs coordinate transformation, in the use of a pole-error estimation value that the position/speed control unit outputs, of phases of currents or voltages applied to the motor, and estimates a motor magnetic pole position being a relative position of the motor mover by making the pole-error estimation value approximate a true pole-error value that is the difference between a motor magnetic pole position being a relative position of the motor mover and a target magnetic pole position being a target relative position of the motor mover. The estimation method further includes a first pole-error inputting step of inputting a first pole-error estimation value whose phase is shifted by $+\alpha$ from a reference phase; a forward movement step of making the pole-error estimation value approximate the true pole-error value, in the use of a value sensed by the motor sensor when the relative position of the motor mover is moved forward by the first pole-error inputting step; a first phase movement storing step of storing a first pole-error-estimate convergence value that is a phase when relative movement of the motor mover has converged in the forward movement step; a second pole-error inputting step of inputting a second pole-error estimation value whose phase is shifted by $-\alpha$ from the reference phase; a backward movement step of making the pole-error estimation value approximate the true pole-error value, in the use of a value sensed by the motor sensor when the relative position of the motor mover is moved backward by the second pole-error inputting step; a second phase movement storing step of storing a second pole-error-estimate convergence value that is a phase when relative movement of the motor mover has converged in the backward movement step; and a pole position estimating step of estimating the true magnetic pole position on the basis of the pole-error-estimate convergence values stored in the first phase movement storing step and the second phase movement storing step. Therefore, the estimation method can reduce detection error without enlarging the amplitude of a signal for estimation; the amount of relative movement of the motor mover can be reduced during detection operations, magnetic pole positions become the same before and after its detection, and a calculation load to estimate a magnetic pole position can be made small so as to make a calculation time shorter. In addition, hereinafter, when several steps are performed sequentially, the set of the steps is referred as an operation set, for explaining embodiments.

Figure 1:
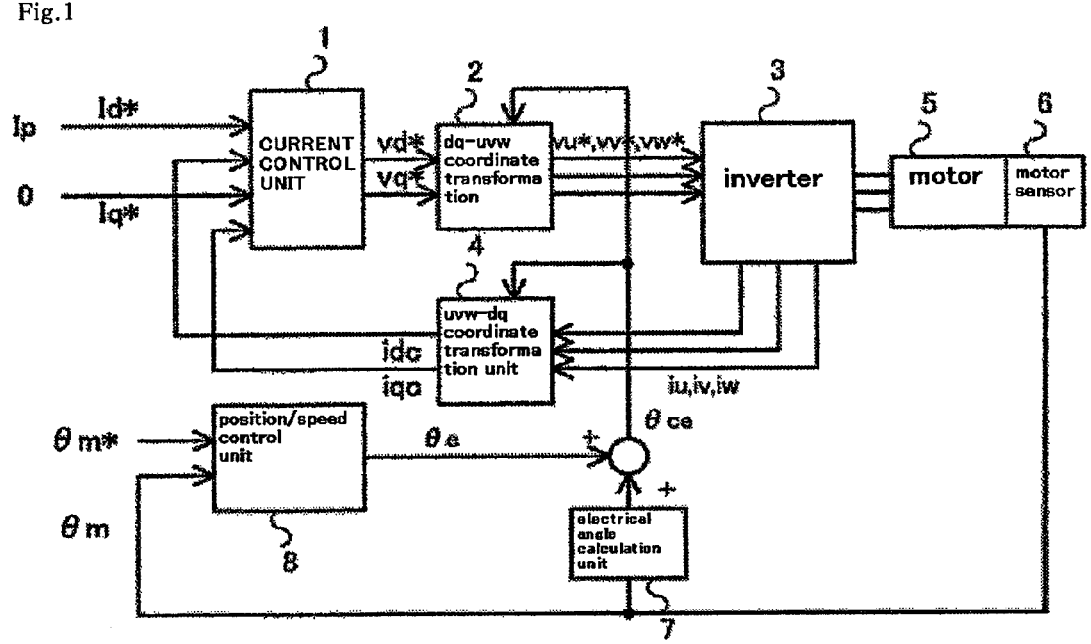
FIG. 1 is a diagram illustrating a configuration of control blocks in Embodiment 1 according to the present invention.

REFERENCE NUMERALS 1 current control unit
2 dq/uvw coordinate transformation unit
3 inverter
4 uvw/dq coordinate transformation unit
5 motor
6 motor sensor
7 electrical angle calculation unit
8 position/speed control unit
9 applied-signal coordinate transformation unit
101 position-proportional gain block
102 speed calculation block
103 speed-proportional gain block
104 speed-integral calculation block
$\theta_{ce}$ phase for coordinate transformation
$\theta_e$ pole-error estimation value
$\theta_m$ motor position θ$_{m^*}$ command value for motor position
I$_p$ current signal for estimation
V$_p$ voltage signal for estimation

BEST MODE FOR CARRYING OUT THE INVENTION

Embodiment 1

A configuration of a magnetic pole position estimation device for an AC synchronous motor according to the present embodiment will be explained. In FIG. 1, a configurational diagram of control blocks to control a magnetic pole position according to the present embodiment is illustrated. Hereinafter, such words as "a relative position of a motor mover", "relative movement of a motor mover" and "a relative speed of a motor mover" are abbreviated to "a motor position", "motor movement", and "a motor speed", respectively. In addition, "a magnetic pole position" and "a motor magnetic pole position" mean that when a magnetic pole of a motor is configured on a motor mover it is a relative position of the magnetic pole with respect to a reference, and that when one or a plurality of pairs of magnetic poles is configured on a motor stator it is a relative position (equivalent to an electric angle) of the motor mover with respect to a pair of magnetic poles.

A current control unit 1 controls currents, in the use of dq-axis-current commands and feedback values for dq-axis currents, to output dq-axis-voltage commands. Proportional-integral control is generally used for current control. A dq-uvw coordinate transformation unit 2 transforms the dq-axis-voltage signals to output three-phase-voltage signals on the basis of phase information for coordinate transformation, which will be described later. An inverter unit 3 performs electric power conversion on the basis of the three-phase-voltage command signals to generate voltages driving a motor 5. A uvw-dq coordinate transformation unit 4 transforms three-phase current signals on the basis of phase information for coordinate transformation to output feedback values for dq-axis currents. An electrical angle calculation unit 7 transforms to an electrical angle position a true motor position sensed by a motor sensor 6 connected to a rotating part or a movable part of the motor. A position/speed control unit 8 performs position control or speed control for the motor in the use of a motor-position command value (θ$_{m^*}$)—representing a position to which the motor magnetic pole is to move—and a real motor position (θ$_m$)—sensed by the motor sensor 6, to output a pole-error estimation value (θ$_e$). In addition, the pole-error estimation value (θ$_e$) outputted from the position/speed control unit 8 is added to the electrical angle position outputted from the electrical angle calculation unit 7 so as to obtain a phase (θ$_{ce}$) for coordinate transformation, which is used as the phase information for coordinate transformation.

Figure 2:
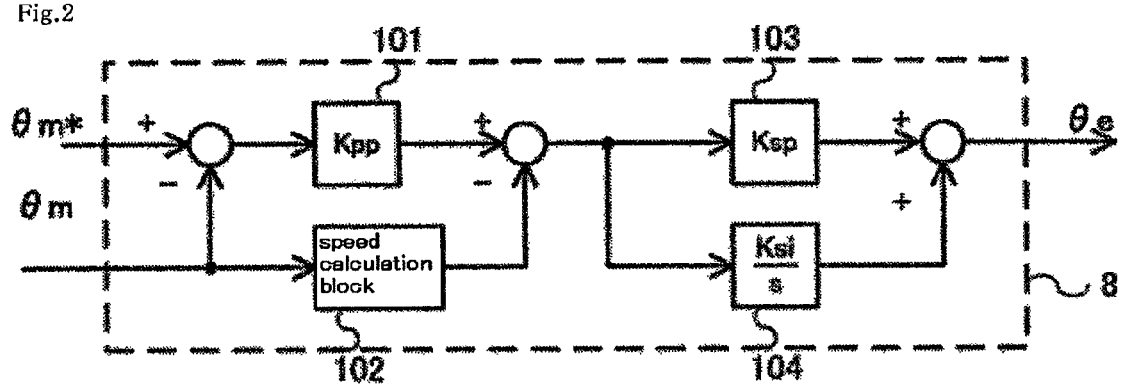
FIG. 2 is a diagram illustrating a configuration example of control blocks for a position/speed control unit.

Next, an example of the position/speed control unit 8 will be explained in detail in the use of FIG. 2. FIG. 2 shows a configuration example in which position-proportion control and speed-integral control are performed. A position-proportional block gain block 101 multiplies a deviation between the motor-position command value (θ$_{m^*}$) and the motor position (θ$_m$) by a position-proportional block gain to output a motor speed command value. A speed calculation block 102 performs a differential operation or similar one with respect to the motor position to obtain a motor speed. A speed-proportional gain block 103 multiplies a deviation between the motor speed command value and the motor speed by a speed-proportional block gain. A speed-integral block 104 multiplies the deviation between the motor speed command value and the motor speed by a speed-integral block gain and integrates its multiplication result as an integrator. The position/speed control unit outputs a pole-error estimation value that is a summation of outputs from the speed-proportional gain block 103 and the speed-integral calculation block 104. The position/speed control unit 8 makes the pole-error estimation value approximate the true pole-error value that is the difference between the motor magnetic pole position and the target magnetic pole position.

Next, a magnetic pole position estimation method according to the present embodiment will be explained in the use of FIG. 3. When a DC current signal having a constant amplitude is applied as an estimation-use electric current signal I$_p$, if there exists a magnetic pole position error between a target magnetic pole position and a true magnetic pole position, error torque is generated according to the magnetic pole position error. A forward position error generates a forward error torque, and a backward position error generates a backward error torque; therefore, because the error torques operates as disturbance torque to move the motor position, a magnetic pole position is estimated by using movement of the motor position. Here, for generating disturbance torque—error torque, a method is adopted in which a fixed current signal for estimation is inputted as a d-axis current in order to change the pole-error estimation value from that corresponding to the true magnetic pole position.

In the present embodiment, in order that the motor position is controlled to move within a small amount, a motor position command value (θ$_{m^*}$=0) is inputted in advance. The position/speed control unit 8 performs the position/speed control in response to movement of the motor position (θ$_m$) sensed by the motor sensor 6, so that the control unit outputs a positive pole-error estimation value during a forward movement, and a negative one during a backward movement. The obtained pole-error estimation value is added to the electrical angle of the motor position to update the phase for coordinate transformation, so that the phase of the current signal for estimation is equivalently changed to reduce the error torque; thereafter, the error torque finally comes to zero, so that the motor position converges to a position where the motor position stops moving; and the pole-error estimation value approximates the true pole-error value. At that time, the pole-error estimation value is approximately zero. By operations above, the magnetic pole position is estimated.

When inputting a pole-error estimation value, and if the motor position is shifted by the magnetic pole position estimation, there occurs a deviation between the motor-position command value (θ$_{m^*}$=0) and the motor position (θ$_m$); therefore, the position/speed control unit 8 operates to reduce the deviation and outputs a pole-error estimation value to control the phase for coordinate transformation, which is used for the dq-uvw coordinate transformation unit 2 and the uvw-dq coordinate transformation unit 4 shown in FIG. 1. While a deviation between the motor-position command value (θ$_{m^*}$=0) and the motor position (θ$_m$) exists, an integrator—the speed-integral calculation block 104—in FIG. 2 accumulates values to keep operating the pole-error estimation value output; therefore, the motor position (θ$_m$) approaches the motor-position command value (θ$_{m^*}$=0); and when the pole-error value finally reaches a convergence value, the deviation between the motor-position command value (θ$_{m^*}$=0) and the motor position (θ$_m$) comes close to zero. By the above operations performed, in the present configuration, the pole-error estimation value approaches the true pole-error value, and the estimation of the magnetic pole position and the motor speed/position control thereof are simultaneously performed. That is, a value sensed by the motor sensor 6 is inputted into the position/speed control unit 8 to control the position or speed of the motor; coordinate transformation of phases of voltages or currents applied to the motor is performed, in the use of a pole-error estimation value ($\theta_e$) outputted from the position/speed control unit 8; whereby, the pole-error estimation value ($\theta_e$) is made close to the true pole-error value that is the difference between the motor magnetic pole position and a target magnetic pole position to estimate a magnetic pole position.

Figure 3:
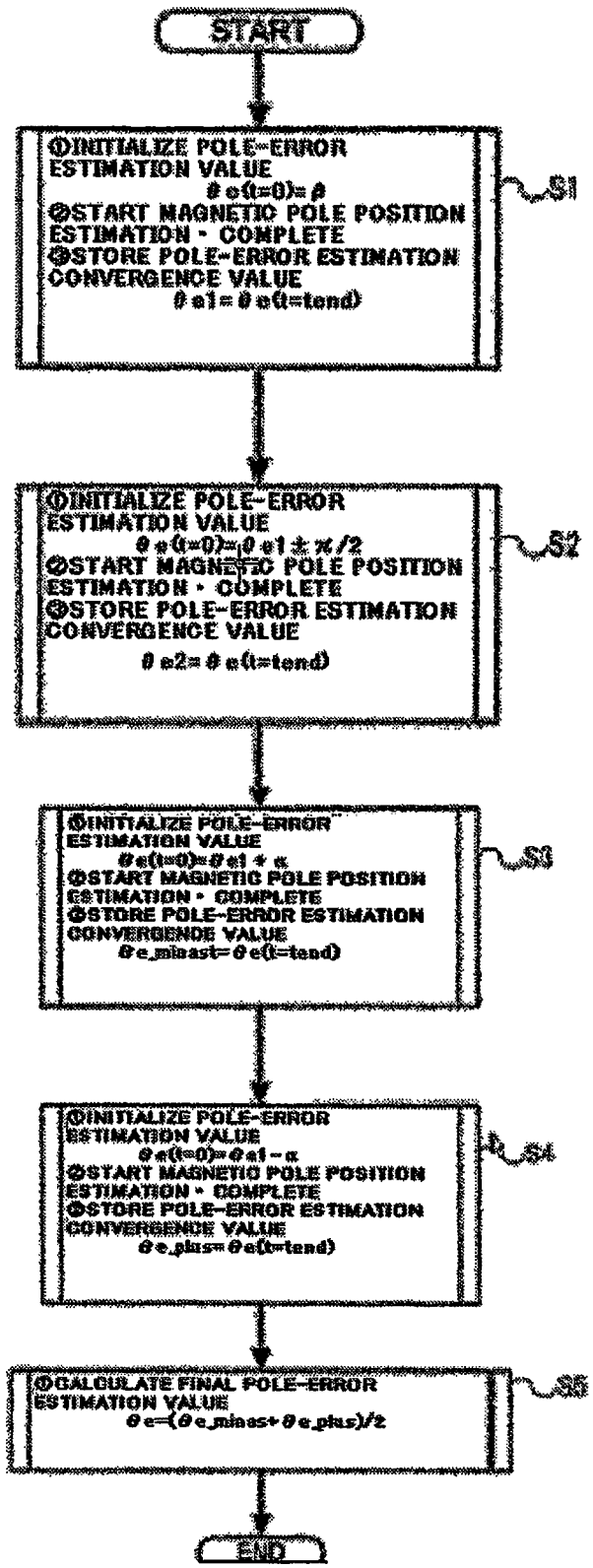
FIG. 3 is a chart of operation sets for magnetic pole position estimation in Embodiment 1 according to the present invention.

Next, operation sets to perform a magnetic pole position estimation according to Embodiment 1 is shown in FIG. 3. Firstly, in an operation set S1, a magnetic pole position is estimated with an initial value for a pole-error estimation value being set to a certain angle (for example, β). Next, in an operation set S2, a reference phase is calculated by estimating a magnetic pole position with an initial value for a pole-error estimation value being set to a position shifted by approximately −90 degrees or +90 degrees from the magnetic pole position estimation value converged in the operation set S1 (when the sign of β is plus, shifted by approximately −90 degrees, and when minus, shifted by approximately +90 degrees).

Next, in an operation set S3, a magnetic pole position is estimated with an initial value for a pole-error estimation value being set to a position shifted by +90 degrees from the reference phase converged in the operation set S2, to be stored as its convergence value. Next, in an operation set S4, a magnetic pole position is estimated with an initial value for a pole-error estimation value being set to a position shifted by −90 degrees from the reference phase converged in the operation set S2, to be stored as its convergence value. In addition, in the operation sets S3 and S4 according to the present embodiment, the explanations have been made that the shift amounts of ±90 degrees are used; however, in the present invention, the shift amounts are not limited to those values, the pole-error estimation values in the operation sets S3 and S4 may be ±α, for example, as long as they have the opposite signs.

Finally, in an operation set S5, the average of the convergence values obtained in the operation sets S3 and S4 is used as the final pole-error estimation value.

In Embodiment 1, inputting an initial value for a pole-error estimation value ($\theta_e$) can be performed by inputting the initial value as the integration-update value of the speed-integral calculation block 104 in FIG. 2. When each estimation operation of the operation sets S1 through S4 is completed in the configuration shown in FIG. 2, a convergence value of the magnetic pole error estimation value ($\theta_e$) almost equals the integration-update value in the speed-integral calculation block 104. Therefore, an initial value in the next operation set can be set by reading out the integration-update value, adding to/subtracting from that value a shift value and setting again the result value as the integration-update value.

The operation sets S1 and S2 have an aim to prevent the magnetic pole position from being falsely estimated with an error of 180 degrees. When a magnetic pole error is nearly 180 degrees, the control blocks for magnetic pole position estimation, illustrated in FIG. 1, does not generate error torque; therefore, in such a case, it is impossible to estimate the magnetic pole position. That is, only one estimation operation in the operation sets cannot distinguish whether the magnetic pole error is 0 degrees or 180 degrees. Inputting a current shifted by 90 degrees in the operation set S2 can secure a magnetic pole estimation even with a 180 degree error. Therefore, when the estimation operation in the operation set S2 is completed, the amount of magnetic pole error becomes almost zero, so that the motor magnetic pole position almost coincides with the target magnetic pole position.

The operation sets S3 and S4 have an aim to eliminate the effect of static friction. If there is a static friction, the magnetic pole position estimation is completed at the time when error torque for estimation becomes less than the static friction, so that a magnetic pole error remains. When balanced with a forward static friction, there remains a positive magnetic pole error; and when balanced with a backward static friction, there remains a negative magnetic pole error. Therefore, initial values of the pole error estimation value in the operation sets S3 and S4 are each shifted in the forward direction and the backward direction to perform the operation sets, and the true pole-error estimation value is estimated from a pole-error estimation value including a positive magnetic pole error obtained by a forward shift operation and one including a negative magnetic pole error obtained by a backward shift operation, which can reduce estimation error due to the static friction. If the static friction magnitudes are the same between the forward shift operation and the backward shift operation, the errors can be cancelled completely; the theory holds that the estimation error can be reduced to exact zero.

In the present embodiment, the average value is calculated from pole-error estimation values when a forward shift and a backward shift are made, in order to cancel the effects of the static friction; however, the static friction may be estimated separately to calculate the true pole-error estimation values using the calculation result. When applying a DC current signal Ip, the magnitude of the static friction can be obtained by a formula shown below.

$$F_s = K_t \cdot I_p \cdot \sin((\theta_{e\_minus} + \theta_{e\_plus})/2) \quad \text{(Formula 1)}$$

An application of a conditional branch on an initial shift value in the operation set S2 can omit either of the operation sets S3 and S4.

The output value from the position/speed control unit 8 is used for a convergence value of a pole error estimation value for each operation set; however, if an integral control is performed with respect to position or speed, the output from the integrator may be used; and if a position control is incorporated, the phase information for coordinate transformation may be used.

Here, a method for designing the position/speed control gains will be explained. The maximum movement value $\Delta\theta_{max}$ of a motor position $\theta_m$ by one operation set can approximately be obtained in the use of a formula below.

$$\Delta\theta_{max} = \frac{K_t I_p \theta_{err0}}{J_t \omega_{sce} \omega_{spie}} \quad \text{(Formula 2)}$$

where $K_t$: torque constant,
$I_p$: amplitude of a superimposed signal,
$\theta_{err0}$: initial quantity of magnetic pole error,
$J_t$: the total inertia,
$\omega_{sce}$: proportional response band for speed control,
$\omega_{spie}$: integral band for speed control. Therefore, speed control gains $\omega_{sce}$ and $\omega_{spie}$ required for obtaining a target movement value $\Delta\theta_{max}$ can be obtained by a back calculation of the above formula. More specifically, designing a speed control band $\omega_{sce}$ with a formula shown below can give a value close to the target movement value.

$$\omega_{sce} = \sqrt{\frac{NK_t I_p \theta_{err0}}{J_t \cdot \Delta\theta_{max}}} \quad \text{(Formula 3)}$$

where N is a ratio of the proportional response band to the speed-control-integral band so as to be set to a ratio generally used for a proportion-integral control.

When a position control is performed, a position-control response band may be set as a value that is, to some extent, smaller than the proportional response band for speed control calculated by the above formula. If a position-control response band is set as a value larger than a proportional response band for speed control, it is possible to make the motor position move extremely less for the magnetic pole position estimation; however, when an inappropriate value is set to the respond band, there arise bad effects such as an instable control and an error increase in detection due to noises. Gains for position/speed control that are designed according to the above description are appropriate control gains that can secure operations of magnetic pole position estimation with a target movement value of a motor.

Figure 4:
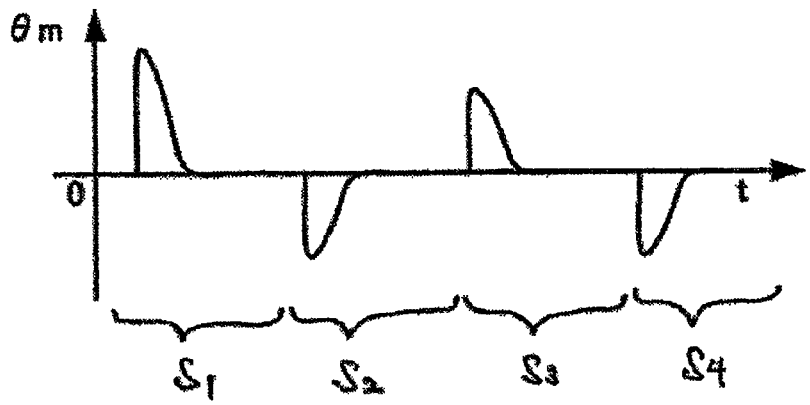
FIG. 4 is an oscillogram of motor position ($\theta_m$) while performing magnetic pole position estimation in Embodiment 1 according to the present invention.

FIG. 4 illustrates how a motor position ($\theta_m$) moves when the operation sets for magnetic pole position estimation according to the present embodiment is performed. As shown in the figure, each of the operation sets controls to make the motor position ($\theta_m$) return to the original position that is a motor-position command value ($\theta_{m*}=0$); therefore, even if a plurality of operation sets is repeated, the motor position ($\theta_m$) is not shifted from that before the magnetic pole position estimation is performed.

The application of Embodiment 1 can provide effects as follows. In comparison with the technique described in Patent document 1, a magnetic pole position estimation with a higher accuracy can be achieved with less current, which eliminates effects of static friction. Furthermore, the less current provides benefits in that the estimation operations thereby increase neither magnetic pole movements nor noises.

Compared with the technique described in Non-Patent document 1, a magnetic pole position estimation can be performed with less movement because of the position/speed control loop which gives normal operations even when magnetic pole position errors exist. Furthermore, when the position control is incorporated, the magnetic pole position estimation can make the motor positions ($\theta\theta$ being at the same position before and after the estimation; therefore, repeating a plurality of operation sets does not generates pole shifts.

Furthermore, the present embodiment can be configured only by adding to a general servocontrol loop the operation sets for pole position estimation, which has a small amount of software load. As for calculating means, the operation sets use neither a division function nor trigonometric functions such as an arctangent function, resulting in reduction of calculation load, providing a real time detection with high accuracy within an extremely short time.

In addition, the present embodiment does not use structural saliency of motor magnetic poles, so that it can be applied to non-salient motors such as a surface magnet motor.

Furthermore, normally performing each of operation sets S2, S3, and S4 inevitably generates minute changes in motor position ($\theta_m$) or motor speed; therefore, a false detection of the magnetic pole position can be prevented by considering no changes in motor position ($\theta_m$) and motor speed to be a false detection.

When explicitly estimating a static friction, the estimated value of the static friction can be utilized for servocontrol following the magnetic pole detection. Using the integrator output as a convergence value of the pole-error estimation value gives an advantage of being less influenced by noises. Furthermore, when the integration-update value of the speed-integral calculation block 104 is used as an initial value of the magnetic pole position estimation value, it is only necessary to replace values stored in the integrator memory, which brings an advantage of easy calculation.

Embodiment 2

Figure 5:
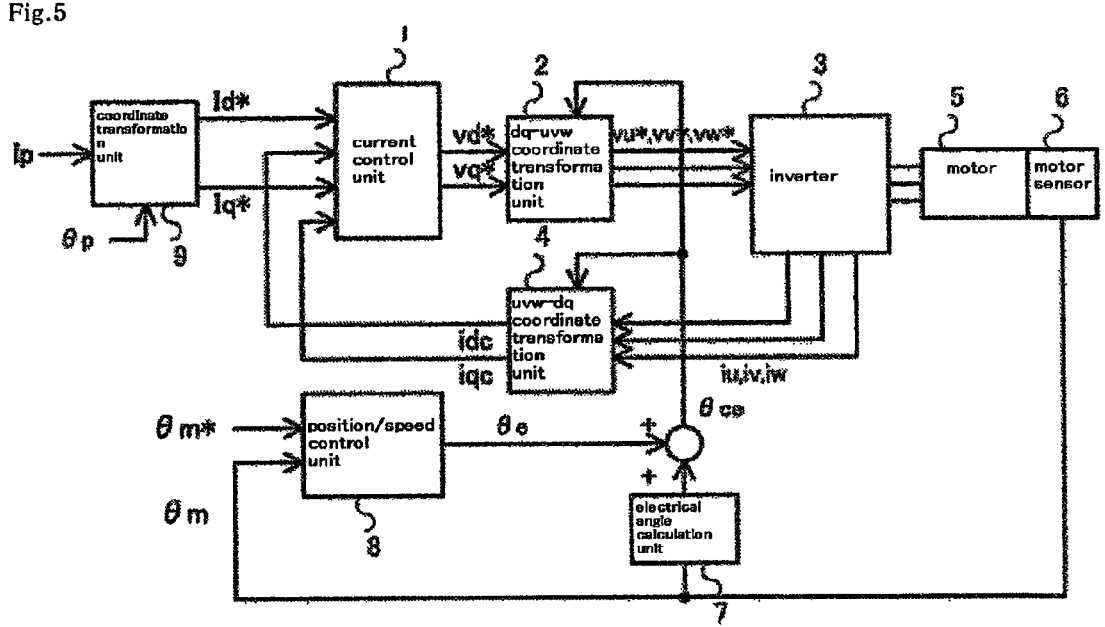
FIG. 5 is a diagram illustrating a configuration of control blocks in Embodiment 2 according to the present invention.

FIG. 5 illustrates a configurational diagram of control blocks to estimate a magnetic pole position according to the present embodiment. In FIG. 5, the components identical with those in FIG. 1 are referred to as the same numerals in order to omit those explanations.

In Embodiment 1, the adopted method for generating disturbance torque—error torque—is that a fixed current signal for estimation is applied as a d-axis current in order to shift the pole-error estimation value from that corresponding to the true magnetic pole position; however, in the present embodiment, an adopted method is to apply a signal for estimation whose phase is shifted from the d-axis in a state with no pole error (in a state in which a true magnetic pole position coincides with a target magnetic pole position). More specifically, as shown in FIG. 5, an applied-signal coordinate transformation unit 9 generates dq-axis current command values. In addition, when an application phase $\theta_p$ used in the applied-signal coordinate transformation unit 9 in the control block configuration according to Embodiment 2 is set to zero ($\theta_p=0$), the configuration is equivalent to that of Embodiment 1.

As for operation sets, the initial pole-error estimation value is changed in every operation set in Embodiment 1; however, in Embodiment 2, instead of the pole-error estimation value, the application phase of the signal for estimation is changed in every operation set, which is the only difference from Embodiment 1. About how to give disturbance torque for estimation operations, there is only a difference—giving an initial value of a pole-error estimation value or a phase of an estimation-use application signal, which is not an essential difference. Therefore, by performing the operation sets described above, it is possible to perform magnetic pole position estimation that eliminates influence from static friction on the same principle as Embodiment 1.

Effects from the present embodiment are basically the same as from Embodiment 1. An advantage of the present embodiment is that a method not using an integral control can be employed for a position/speed control, which can reduce the amount of calculation.

Embodiment 3

Figure 6:
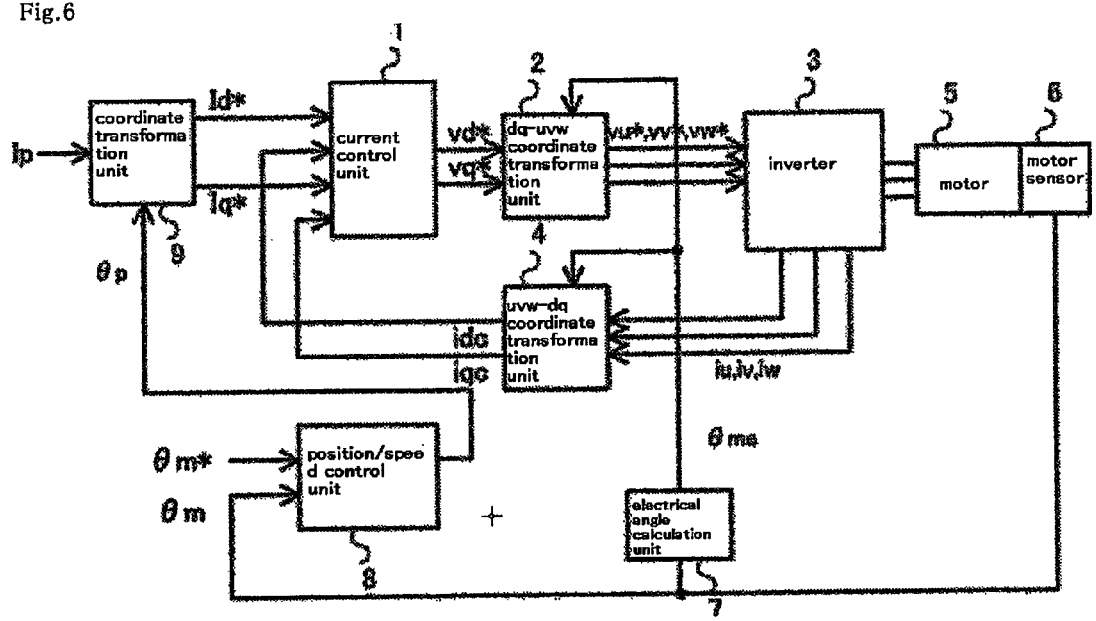
FIG. 6 is a diagram illustrating a configuration of control blocks in Embodiment 3 according to the present invention.

FIG. 6 illustrates a configurational diagram of control blocks to estimate a magnetic pole position according to the present embodiment. In FIG. 6, the components identical with those in FIG. 1 are referred to as the same numerals to omit those explanations.

A configuration employed in Embodiment 3 differs from that of Embodiment 1 as follows: in order to generate a magnetic pole error, a method in which the pole-error estimation value is changed from that corresponding to a true magnetic pole position is not adopted, but a method in which the estimation-use signal whose phase is shifted from the d-axis with no magnetic pole error is applied, is adopted—an applied-signal coordinate transformation unit 9 generates a command value for dq-axis currents; and an output from a position/speed control unit 8 is not added to a motor electric angle, but is used as a coordinate transformation position for an applied-signal coordinate transformation unit 9. In comparison with the control block configuration of Embodiment 2, there is a difference that the coordinate transformation of the pole-error estimation value outputted from the position/speed control unit 8 precedes the current control rather than follows it; however, magnetic pole position operations similar to those by Embodiment 2 can be performed.

Effects from the present embodiment are basically the same as those from Embodiment 1. Because there is no need to modify software blocks for the dq-uvw coordinate transformation unit and the uvw-dq transformation unit, there is an advantage when a magnetic pole estimation function is later implemented.

Embodiment 4

Figure 7:
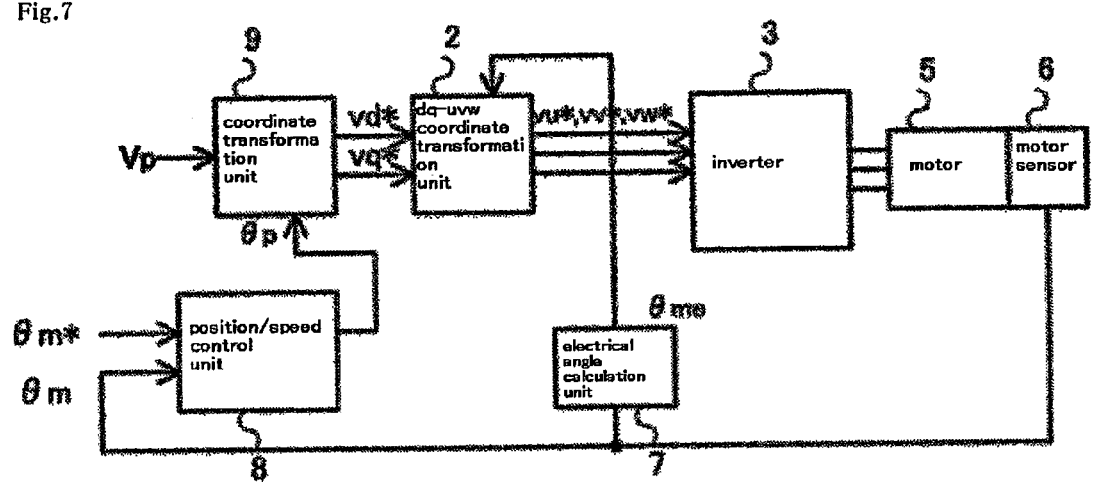
FIG. 7 is a diagram illustrating a configuration of control blocks in Embodiment 4 according to the present invention.

FIG. 7 illustrates a configurational diagram of control blocks to estimate a magnetic pole position according to the present embodiment. In FIG. 7, the components identical with those in FIG. 1 are referred to as the same numerals to omit those explanations.

The configuration of Embodiment 4 is modified from that of Embodiment 3, so that the dg-axis current calculation in the uvw-dq coordinate transformation unit 4 and the current control by the current control unit 1 is eliminated and an estimation-use voltage signal is applied instead of the estimation-use current signal. For DC or low frequency voltages, currents and voltages are almost in the same phase; therefore, operations in the present embodiment are expected to give approximately the same operational behavior as that in Embodiment 3.

The computation amount for magnetic pole position estimation can be largely reduced in the present embodiment in comparison with that in other embodiments. In addition, even if it is impossible to provide a current control loop for some reason, the present embodiment can be applied. For example, when current sensors are not provided or when a failure occurs therein, the present embodiment can be applied.

In the present invention, it can be easily devised, for example, to gradually change the amplitude of a detection-use signal or the initial value for magnetic pole position estimation, in an operation set or every operation set. Although taking longer time for detection, such methods as sequential increase of the amplitude of the detection-use signal within an operation set and sequential decrease of the initial value for magnetic pole position estimation over operation sets can provide higher accuracy detection with less movement of a motor.

Moreover, the configuration of the position/speed control unit according to the present invention is not limited to that illustrated in FIG. 2; such a control as a position-proportion control, an integral control, and a differential control can be employed to perform the same operations as the embodiments. Furthermore, if it is not necessary to strictly keep the magnetic pole position ($\theta_m$) at the same position before and after the estimation, a speed-proportion integral control may be performed on a basis of a speed command value and a motor speed without performing position control. In this case, there can be obtained the same effects to obtain a high accuracy estimation for magnetic pole position with less movement of a motor. If there is a margin of error in motor movement in Embodiments 2 through 4, a speed proportion control may be performed.

In Embodiments 1 through 3, a current signal is applied as a signal for estimation; such aspects as applying an estimation-use voltage signal superimposed in a configuration with a current loop incorporated, and adding an estimation-use signal to a motor-position command value are possible as well. The point is where to apply a signal for generating disturbance torque for magnetic pole position estimation; therefore, other aspects of various kinds are possible.

In Embodiments 1 and 2, estimation is performed with respect to a magnetic pole error that is the difference between a true magnetic pole position of a motor and a target magnetic pole position, then the phase for coordinate transformation is obtained; however, a phase for coordinate transformation may be directly estimated. As for phase information used in coordinate transformation, the electrical angle position outputted from the electrical angle calculation unit 7 is added to the pole-error estimation value ($\theta_e$) outputted from the position/speed control unit 8 to be used as the phase ($\theta_{ce}$) for coordinate transformation; for example, these procedures—calculation, estimation, and addition—are totally performed in the position/speed control unit and the output from the position/speed control unit 8 may be directly used as the phase ($\theta_{ce}$) for coordinate transformation.

What is claimed is:

1. A magnetic pole position estimation method for an AC synchronous motor that controls a relative position or relative speed of a motor mover by inputting into a position/speed control unit a value sensed by a motor sensor, performs coordinate transformation, in the use of a pole-error estimation value that the position/speed control unit outputs, of phases of currents or voltages applied to the motor, and estimates a motor magnetic pole position being a relative position of the motor mover by making the pole-error estimation value approximate a true pole-error value that is the difference between the motor magnetic pole position being the relative position of the motor mover and a target magnetic pole position being a target relative position of the motor mover, the method comprising:

a first pole-error inputting step of inputting a first pole-error estimation value whose phase is shifted by +α from a reference phase;

a forward movement step of making the pole-error estimation value approximate the true pole-error value, in the use of a value sensed by the motor sensor when the relative position of the motor mover is moved forward by the first pole-error inputting step;

a first phase movement storing step of storing a first pole-error-estimate convergence value that is a phase when relative movement of the motor mover has converged in the forward movement step;

a second pole-error inputting step of inputting a second pole-error estimation value whose phase is shifted by −a from the reference phase;

a backward movement step of making the pole-error estimation value approximate the true pole-error value, in the use of a value sensed by the motor sensor when the relative position of the motor mover is moved backward by the second pole-error inputting step;

a second phase movement storing step of storing a second pole-error-estimate convergence value that is a phase when relative movement of the motor mover has converged in the backward movement step; and a pole position estimating step of estimating the true magnetic pole position on the basis of the pole-error-estimate convergence values stored in the first phase movement storing step and the second phase movement storing step.

2. The magnetic pole position estimation method for an AC synchronous motor according to claim 1, further comprising:
- a third pole-error inputting step of inputting a third pole-error estimation value whose phase is shifted by β from an 25 arbitrary phase;
- a third movement step of making the pole-error estimation value approximate a third true pole-error value, in the use of a value sensed by the motor sensor when the relative position of the motor mover is moved by the third pole-error inputting step;
- a fourth pole-error inputting step of inputting a fourth pole-error estimation value whose phase is shifted by approximately +90 degrees or −90 degrees from a phase when relative movement of the motor mover has converged in the third movement step;
- a fourth movement step of making the pole-error estimation value approximate a fourth true pole-error value, in the use of a value sensed by the motor sensor when the relative position of the motor mover is moved by the fourth pole-error inputting step; and
- a reference phase storing step of storing as the reference phase a phase when relative movement of the motor mover has converged in
- the fourth movement step.

3. The magnetic pole position estimation method for an AC synchronous motor according to claim 1, wherein in the pole position estimating step, the true magnetic pole position is estimated based on the average value of the first pole-error-estimate convergence value stored in the first phase movement storing step and the second pole-error-estimate convergence value stored in the second phase movement storing step.

4. A magnetic pole position estimation method for an AC synchronous motor that controls a relative position or relative speed of a motor mover by inputting into a position/speed control unit a value sensed by a motor sensor, performs coordinate transformation, in the use of a pole-error estimation value that the position/speed control unit outputs, of phases of currents or voltages applied to the motor and estimates a motor magnetic pole position being a relative position of the motor mover by making the pole-error estimation value approximate a true pole-error value that is the difference between the motor magnetic pole position being the relative position of the motor mover and a target magnetic pole position being a target relative position of the motor mover, the method comprising:

- a first estimation-use-signal inputting step of inputting into an applied-signal-coordinate-transformation unit a first estimation-use signal whose phase is shifted by +α, from a reference phase;
- a forward movement step of making the pole-error estimation value approximate the true pole-error value, in the use of a value sensed by the motor when the relative position of the motor mover is moved forward by the first estimation-use-signal inputting step;
- a first phase movement storing step of storing a first pole-error-estimate convergence value that is a phase when relative movement of the motor mover has converged in the forward movement step;
- a second estimation-use-signal inputting step of inputting into the applied-signal-coordinate-transformation unit a second estimation-use signal whose phase is shifted by −α from the reference phase;
- a backward movement step of making the pole-error estimation value approximate the true pole-error value, in the use of a value sensed by the motor sensor when the relative position of the motor mover is moved backward by the second estimation-use-signal inputting step;
- a second phase movement storing step of storing a second pole-error-estimate convergence value that is a phase when relative movement of the motor mover has converged in the backward movement step; and
- a pole position estimating step of estimating the true magnetic pole position on the basis of the pole-error-estimate convergence values stored in the first phase movement storing step and the second phase movement storing step.

5. The magnetic pole position estimation method for an AC synchronous motor according to claim 4, wherein the pole-error estimation value is inputted into the applied-signal-coordinate-transformation unit.

6. The magnetic pole position estimation method for an AC synchronous motor according to claim 4, wherein the first estimation-use signal is a first estimation-use current signal, and the second estimation-use signal is a second estimation-use current signal.

7. The magnetic pole position estimation method for an AC synchronous motor according to claim 4, wherein the first estimation-use signal is a first estimation-use voltage signal, and the second estimation-use signal is a second estimation-use voltage signal.

* * * * *